UNITED STATES PATENT OFFICE.

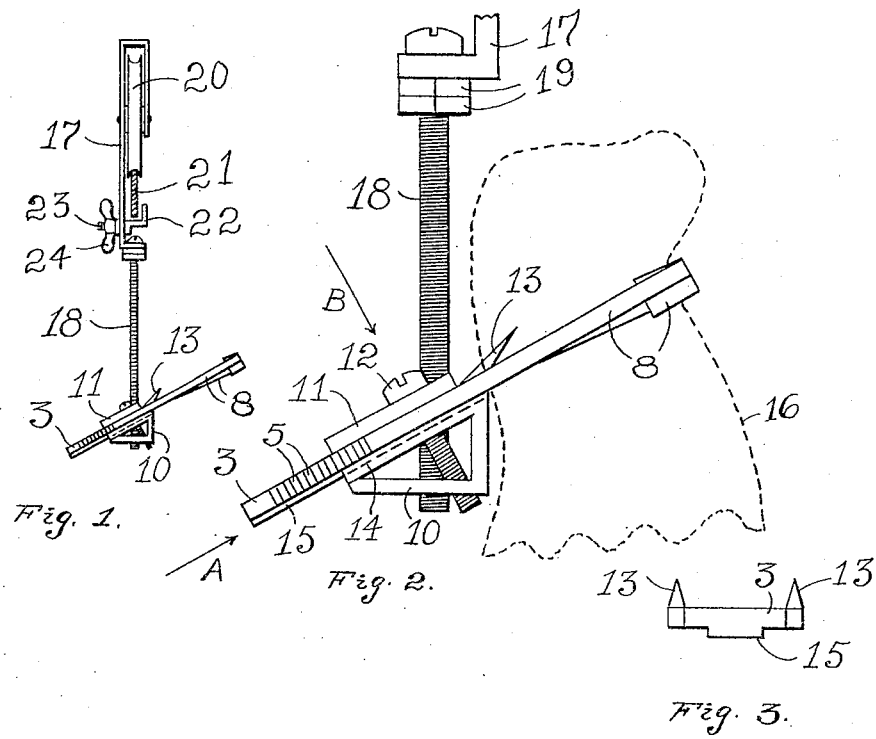
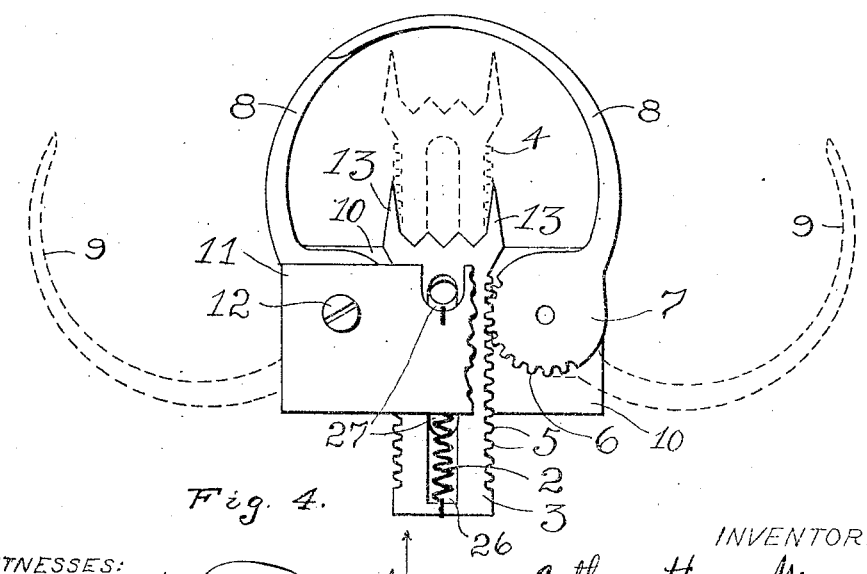

ARTHUR H. MANNING, OF COLORADO SPRINGS, COLORADO.

AUTOMATIC CLUTCH.

1,336,472.     Specification of Letters Patent.     Patented Apr. 13, 1920.

Application filed July 8, 1919. Serial No. 309,522.

*To all whom it may concern:*

Be it known that I, ARTHUR HENRY MANNING, a citizen of Manitoba, in the Dominion of Canada, residing at 501 South Hancock street, in the city of Colorado Springs, in the county of El Paso and State of Colorado, in the United States, have invented new and useful Improvements in Automatic Clutches, of which the following is a specification.

Some of the objects of the invention are to facilitate hanging and removal of meat and other articles and particularly quarters of beef in packing houses where the meat is frozen as the hooks now used are difficult of removal when embedded in the frozen meat.

In the drawings like characters of reference refer to like parts throughout the several views.

Figure 1 is a side elevation of the clutch suspended from a roller carrier mounted upon a conveyer track. Fig. 2 is an enlarged view of the clutch shown in Fig. 1. Fig. 3 is a view of the plunger member 3, looking in the direction of arrows A, A. Fig. 4 is a view of the clutch looking in the direction of arrow B in Fig. 2.

The spring member 2 moves the plunger member 3 forward to the position indicated by the dotted lines 4 and the rack teeth 5 on the plunger 3 engage and operate the pinion teeth 6 on the disk 7 which are integral with the arms 8 and the said arms 8 are thereby outwardly extended as indicated by the dotted lines 9. The arms 8 are pivoted between the base member 10 and the top plate 11 by means of screws 12. An article may be suspended in the clutch by engaging it with the prongs 13 which move backwardly and downwardly in a race the base of which is indicated by the dotted lines 14 which is adapted to fit the guide bar 15 on the under side of the plunger 3. By forcing backwardly the said plunger 3 the arms 8 are forced forward and embrace the article indicated by dotted lines 16, engaging the prongs 13. The clutch is adjustably secured to the carrier 17 by a hanger bolt 18 having lock nuts 19. The roller 20 is prevented from jumping the track 21 by a guide 22 adjustably secured to the carrier 17 by a bolt 23 and a thumb nut 24. The hanger bolt 18 is secured to the base member 10 by threaded connection. The spring 2 operates in a recess 26 in the plunger 3 and the hanger bolt 18 passes through a slot 27 in the said plunger 3.

Having described my invention what I claim and desire to secure by Letters Patent is:

1. An automatically operating clutch adapted to grasp and hold large articles, as quarters of meat, sacks of grain or vegetables and similar packages, comprising, a base, a plunger mounted diagonally downwardly in a race in said base, rack teeth on each side of said plunger, prongs on the upper end of said plunger adapted to engage said articles, opposite embracing clutch arms pivotally mounted on opposite sides of said plunger and upon said base, the pivotal end of each of said arms forming a disk with its under side in movable contact with said base, pinion teeth on the perimeter of said disks adapted to engage said rack teeth so as to operate said arms as said plunger is moved longitudinally, and a spring member adapted to force said plunger upwardly when released from the weight of a suspended article.

2. An automatically operating clutch adapted to grasp and hold large articles, as quarters of meat, sacks of grain or vegetables and similar packages, comprising a base, a plunger mounted diagonally downwardly in a race in said base, said plunger being provided with a longitudinal slot, an adjustable guide bolt extending through said slot in said plunger and through said base adapted to retain said plunger in said race, rack teeth on each side of said plunger, prongs on the upper end of said plunger adapted to engage said articles, opposite embracing curved clutch arms pivotally mounted on opposite sides of said plunger and upon said base, the pivotal end of each of said arms forming a disk with its under side in movable sliding contact with said base, pinion teeth on the perimeter of said disks adapted to engage said rack teeth so as to operate said arms as said plunger is moved longitudinally, a clamp member passing over said plunger and adapted to secure it in slidable contact with said base by means of bolts passing through the ends of said members and through said disks and said base, and a spring member adapted to force said plunger upwardly when released from the weight of a suspended article.

3. An automatically operating clutch adapted to grasp and hold large articles, as quarters of meat, sacks of grain or vegetables and similar packages, comprising a base, and a plunger member provided with a longitudinal slot, an adjustable guide bolt extending through said slot in said plunger and through said base adapted to retain said plunger in said race, rack teeth on each side of said plunger, prongs on the upper end of said plunger adapted to engage said articles, opposite embracing curved clutch arms pivotally mounted on opposite sides of said plunger and upon said base, the pivotal end of each of said arms forming a disk with its under side in movable sliding contact with said base, pinion teeth on the perimeter of said disks adapted to engage said rack teeth so as to operate said arms as said plunger is moved longitudinally, a clamp securing said plunger in place, a spring member adapted to force said plunger upwardly when released from the weight of a suspended article, and an upright supporting member.

ARTHUR H. MANNING.

Witnesses:
J. N. RICKARDS,
FRANK D. WARREN.